United States Patent
Jackman (10) Patent No.: US 9,541,307 B2
(45) Date of Patent: Jan. 10, 2017

(54) SOLAR THERMAL ENERGY CAPTURE SYSTEM WITH OVERHEATING PROTECTION AND COLD TEMPERATURE BYPASS

(75) Inventor: Tom Jackman, Calgary (CA)

(73) Assignee: Trathom Corporation, Alberta (CA)

( * ) Notice: Subject to any disclaimer, the term of this patent is extended or adjusted under 35 U.S.C. 154(b) by 135 days.

(21) Appl. No.: 13/984,510

(22) PCT Filed: Feb. 8, 2012

(86) PCT No.: PCT/CA2012/000132
§ 371 (c)(1),
(2), (4) Date: Dec. 3, 2013

(87) PCT Pub. No.: WO2012/106813
PCT Pub. Date: Aug. 16, 2012

(65) Prior Publication Data
US 2014/0076305 A1     Mar. 20, 2014

Related U.S. Application Data

(60) Provisional application No. 61/440,811, filed on Feb. 8, 2011.

(51) Int. Cl.
F24J 2/40 (2006.01)
H02S 40/44 (2014.01)
(Continued)

(52) U.S. Cl.
CPC ............ *F24J 2/402* (2013.01); *F24D 17/0021* (2013.01); *F24D 19/082* (2013.01);
(Continued)

(58) Field of Classification Search
CPC ......... Y02B 10/20; Y02B 10/22; Y02B 10/24; Y02E 10/40; Y02E 10/44; F24F 5/0046; F24F 5/0064; F24H 4/04; F16K 31/002
See application file for complete search history.

(56) References Cited

U.S. PATENT DOCUMENTS 3,960,322 A * 6/1976 Ruff .................. F03G 6/00
                                                  62/228.1
3,977,601 A * 8/1976 Bearzi .................. 126/586
(Continued)

FOREIGN PATENT DOCUMENTS

| EP | 2056039 A1 | 5/2009 |
|---|---|---|
| GB | 2469321 A | 10/2010 |
| WO | WO 2009/063117 A1 | 5/2009 |

OTHER PUBLICATIONS

International Search Report for corresponding International Application No. PCT/CA2012/000132 mailed on May 28, 2012.
(Continued)

*Primary Examiner* — David J Laux
(74) *Attorney, Agent, or Firm* — Billion & Armitage; Benjamin C. Armitage (57) ABSTRACT

A thermoregulation apparatus for a solar thermal energy capture system comprising a piping infrastructure in fluid communication with a fluid storage tank and one or more solar thermal energy collectors. The thermoregulation apparatus comprises: (i) a thermostatically actuated valve interposed the piping infrastructure downstream from the one or more solar energy collectors and upstream from the fluid storage tank, and (ii) piping for interconnecting the thermostatically actuated valve with the piping infrastructure, and the fluid storage tank. The thermostatically actuated valve can be configured for diverting the flow of working fluid away from the fluid storage tank when the temperature of the working fluid is below a selected set point for actuating the valve, and for diverting the flow of working fluid to the fluid
(Continued)

storage tank when the temperature of the working fluid is about or greater than the selected set point.

14 Claims, 6 Drawing Sheets

(51) Int. Cl.
| | |
|---|---|
| F24D 17/00 | (2006.01) |
| F24D 19/08 | (2006.01) |
| F24D 19/10 | (2006.01) |
| F24J 2/34 | (2006.01) |
| F24J 2/46 | (2006.01) |

(52) U.S. Cl.
CPC .......... *F24D 19/1057* (2013.01); *F24J 2/345* (2013.01); *F24J 2/4625* (2013.01); *H02S 40/44* (2014.12); *F24D 2200/02* (2013.01); *F24D 2200/14* (2013.01); *Y02B 10/20* (2013.01); *Y02E 10/40* (2013.01); *Y02E 10/60* (2013.01)

(56) References Cited

U.S. PATENT DOCUMENTS

| | | | | |
|---|---|---|---|---|
| 4,156,420 | A * | 5/1979 | Gunderson | 126/655 |
| 4,191,172 | A * | 3/1980 | Walch et al. | 126/587 |
| 4,257,479 | A * | 3/1981 | Newton | 165/156 |
| 4,473,063 | A * | 9/1984 | Mackensen | F24J 2/402 |
| | | | | 126/585 |
| 4,476,853 | A * | 10/1984 | Arbogast | F24D 11/003 |
| | | | | 126/572 |
| 4,531,510 | A * | 7/1985 | Barthez | F24D 11/00 |
| | | | | 126/585 |
| 8,820,315 | B2 * | 9/2014 | Jackman | 126/591 |

OTHER PUBLICATIONS

Written Opinion for corresponding International Application No. PCT/CA2012/000132 mailed on May 28, 2012.

\* cited by examiner

SOLAR THERMAL ENERGY CAPTURE SYSTEM WITH OVERHEATING PROTECTION AND COLD TEMPERATURE BYPASS

This application is a National Stage Application of PCT/CA2012/000132, filed 8 Feb. 2012, which claims benefit of Application No. 61/440,811, filed 8 Feb. 2011 in the US and which applications are incorporated herein by reference. A claim of priority to all, to the extent appropriate, is made.

FIELD

The present disclosure relates to systems and apparatus for solar thermal energy capture and more particularly, to systems and apparatus for controlling flow of fluids through solar thermal energy capture and/or heat exchange systems.

BACKGROUND

The use of solar radiation for heating fluids, such as water, has been known for many years. Modern solar heating systems incorporated into buildings typically include one or more solar energy collector panels suitable for absorbing energy from the sun wherein the solar energy is converted into thermal energy transferred to fluids circulating therethrough and which subsequently circulate throughout the buildings for heating purposes or for storage.

Solar energy collector panels are generally installed on the roofs of buildings. A small residential home will typically require a solar system having at least about three or four square meters of solar energy collection surface area to supplement domestic water heating. A home that also uses solar energy for space heating or other heating applications will typically require ten to twenty square meters of collection surface area whereas an industrial or commercial facility may need thirty square meters or more depending on the solar heating application.

Solar collector panels are usually mounted flat on roofs to be the least obtrusive to the overall appearance of the building. Such configurations do not maximize the amounts of solar energy that may be captured by the collectors. In more northern regions, the solar energy collectors should be tilted up towards the southern horizon, and in more southern regions, they should be tilted up towards the northern horizon. Tilting solar collector panels increases the capture of solar energy in winter months, but this can cause wind load problems, especially with flat-plate collectors. Evacuated-tube collectors are not as prone to wind loading due to spacing provided between the tubes. Tilting of the solar energy collector panels, however, results in prominent views of the solar energy collectors which may be undesirable. One solution has been to mount the solar energy collectors on a south-facing wall (in northern hemispheres). Such installations are possible during new building construction, but may be difficult or impossible for retrofitting existing buildings. Other solutions for mitigating the visual prominence of solar collector panels are achieved by architecturally integrating the collector area into the building structure. Examples of architecturally integrated solar collectors include window shutters, balcony railings, awnings, facia, fences and privacy screens.

Solar water heaters known in the art generally comprise one of two systems. "Combined systems" have one or more solar energy collector panels mounted directly onto a water storage tank. Combined systems are generally used in warm climates because the water tanks are exposed to the ambient environment and consequently, fluids stored therein are rapidly cooled as ambient temperatures drop. "Distributed systems" have solar energy collector panels mounted on surfaces receiving solar radiation and are connected by piping infrastructures to water storage tanks located in sheltered spaces to minimize heat losses due to cooler ambient temperatures.

Additionally, solar water heaters are classified as either "direct systems" or "indirect systems". Direct systems can comprise combined or distributed systems, and are configured to circulate domestic water through the solar energy collector panels. One problem with direct systems is that circulation of domestic water often causes the formation of mineral scales along the interior surfaces of piping comprising the solar energy collector panels. Another problem with direct systems is that solar energy collector panels must be drained when ambient temperatures fall below freezing to prevent damage to the piping. Indirect systems are more sophisticated distributed systems that circulate a heat transfer fluid, also commonly referred to as a working fluid, between the solar energy collector panels through a piping infrastructure to a heat exchange unit communicating with the working fluid on one side, and a flow of potable water on the other side. The heat exchange unit transfers thermal heat from the working fluid to the potable water. The heat exchange unit may be placed inside a water tank wherein potable water is stored. Alternatively, the heat exchange unit may be located on an external surface of the water storage tank and directly connected thereto, or further alternatively, the heat exchange unit may be located in a separate location and connected to the water tank by a piping infrastructure. Working fluids used in the indirect systems typically are provided with antifreeze agents.

The above classification of solar water heaters also applies to solar heaters used in other heating applications such as pool heating, space heating, process heating or any other application where heating a fluid is desired. In all cases a fluid heated by solar energy collector panels is used directly or indirectly to provide heat energy.

Conventional solar heating systems are usually configured to enable stoppage of the circulation of the potable water or working fluid through the piping infrastructure connected to the solar energy collector panels, the water storage tanks and the heat exchange units during periods of low or no solar irradiation in order to avoid the loss of thermal energy that has been previously captured by the solar collector panels and reduce unnecessary pump operation costs. Some systems use a "drain-back" approach to drain the working fluid into a holding tank during shutdown periods. Non-"drain-back" systems require the addition of sufficient anti-freeze agent to ensure working fluids do not freeze and cause physical damage to the piping and/or the solar energy collector panels. Regardless of the shutdown strategy used, the working fluids cool significantly during idle periods and have to be re-heated once the system starts operating. This results in inefficient operation during the first few minutes or hours of operation of the solar thermal energy capture systems depending on how low the ambient temperatures become and the quantity of working fluid in the solar heating system. It is a particular problem in cold climates where overnight temperature drop significantly below freezing.

Solar thermal energy capture systems must also be configured to prevent damage that may be caused by excessive heat build-up during periods of high solar energy. Control methods are necessary to mitigate damage from high-temperature fluid flowing through either or both of the working fluid side and the load side of the heat exchange units and piping infrastructure. Additionally, as a fail-safe precaution, allowances must be made for relief of pressure that may accumulate through excessive heat on the working fluid side caused by extended intense solar radiation. Strategies used for controlling overheating in conventional solar thermal energy capture systems include among others: (i) "heat dumps" which are a remote heat application where unwanted heat is dumped such as under an outdoor patio; (ii) draining back and shutting down the system and permitting the solar collectors to stagnate; (iii) manually setting the system controller to a "vacation" setting when the primary application is not required, as is the case when a homeowner with a solar water heater goes on vacation, which activates a control sequence to avoid over heating such as by circulating the working fluid through the collectors over night to increase heat losses; or (iv) deliberately under-sizing the system such that the system's peak output provides 90% of the minimum anticipated heat load, which means that other energy providers exemplified by gas utilities and electric utilities, must be relied upon as supplemental heating sources.

Consequently, conventional systems configurations for solar thermal energy capture have become fairly complex. Some systems are designed to have multiple fluid circuits wherein one circuit is dedicated for dissipation of excess heat energy. Other strategies employ complex piping infrastructures with separate heat dissipater circuits for cooling overheated working fluid exiting the solar energy collector panels. With such systems, all of the working fluid is heated by the solar panels and then cooled after egress resulting in system inefficiencies.

Most conventional solar thermal energy capture systems incorporate electronic control systems for activating or de-activating the fluid circulation pumps and valves to enable control over and manipulation of fluid flow throughout the system, filling or imposing drain-backs, directing working fluid through solar collector panels and heat exchange units, or for activating over-heating mitigation mechanisms. These control and operating systems require electrical energy usually supplied by an electric utility company. Electrical power interruptions will result in loss of control over the solar thermal energy capture system that could result in physical damage to the system, and in collateral damage to the building in the event that the piping infrastructure fails. One solution to ensure electrical power supply has been to use battery backups. In some systems, solar photovoltaic (PV) systems are available to supply the necessary electrical energy either directly to the solar heating system and controller, or indirectly, such as battery packs and the like. However, battery systems have a relatively short life expectancy. Moreover, failure to test and replace the battery can lead to the same type of damage as seen with loss of electrical power. Furthermore, the electronic control methods are prone to component failures, particularly within the twenty- to thirty-year life expectancy of solar collector systems.

SUMMARY

The exemplary embodiments of the present invention relate to solar fluid heat exchange systems.

One embodiment of the present invention relates to a thermoregulation apparatus of a direct solar fluid heat exchange system. The heat exchange system comprises a piping infrastructure that is in fluid communication with: (a) one or more solar energy collectors; (b) a fluid storage tank; and (c) a thermostatic valve. The working fluid circulates through the piping infrastructure to be heated by the solar energy collectors, which harness solar energy from the sun. The working fluid thereafter circulates to the fluid storage tank. The thermoregulation apparatus comprises a thermostatic valve and operates to regulate the flow of the working fluid. The thermostatic valve is configured to divert the flow of the working fluid away from the fluid storage tank and back to the solar energy collectors for heating if the temperature of the working fluid is below a preset minimum temperature.

In the case of an indirect solar fluid heat exchange system, the system comprises a piping infrastructure that is in fluid communication with: (a) one or more solar energy collectors; (b) a fluid heat exchanger; and (c) a thermostatic valve. The working fluid circulates through the piping infrastructure to be heated by the solar energy collectors and thereafter circulates to the fluid heat exchanger. The thermoregulation apparatus comprises a thermostatic valve and operates to regulate the flow of the working fluid. The thermostatic valve is configured to divert the flow of the working fluid away from the fluid heat exchanger and back to the solar energy collectors for heating if the temperature of the working fluid is below a preset minimum temperature.

Another embodiment of the present invention relates to a solar fluid heat exchange system comprising both a minimum-temperature thermoregulation apparatus and a maximum-temperature thermoregulation device managing the flow of working fluid through the solar fluid heat exchange system. In the indirect solar heating system, the heat exchange system comprises: a piping infrastructure in fluid communication with one or more solar energy collectors, a fluid heat exchanger, a heat dissipater, and two control valves. The high temperature control valve is positioned downstream of the solar energy collectors and the heat dissipater. This control valve substantially continuously monitors the temperature, pressure or other condition of the system that can be indicative of overheating while the system is in operation. If the control valve senses overheating, at least a portion of the working fluid is mixed with cooler fluid that has traversed the parallel heat dissipater in order to decrease the temperature of the working fluid and avoid overheating the system. When the temperature (or pressure or other condition) of the working fluid returns to the normal operating range, the mixing stops and all the working fluid traverses directly from the solar energy collectors to the fluid heat exchanger. The low temperature valve is positioned downstream of the solar energy collectors and upstream of the fluid heat exchanger. This control valve is configured to divert cold working fluid away from the normal flow into the fluid heat exchanger and instead back to the solar energy collectors for continued heating, in order to increase the efficiency of the heating exchange system. When the working fluid is heated to the low temperature valve's setpoint the normal flow into the storage tank is resumed. The heat exchange system further comprises a solar-powered pump for pumping the working fluid through the piping infrastructure during a period of solar energy collection. When the above embodiment of the invention is applied to a direct solar heating system the fluid heat exchanger is replaced by a fluid storage tank or reservoir.

The one or more solar energy collectors may be evacuated-tube heat pipe collectors, flat-plate solar energy collectors, or any other type of solar thermal collector or panel for absorbing solar energy from the sun.

The one or more solar energy collectors are sized for maximum solar energy absorption, not under-sized to avoid overheating.

The solar-powered pump is preferably powered by a photovoltaic panel such that the system is independent from an electric utility grid and any other external energy provider.

The one or more solar energy collectors may function as balusters of a solar balustrade or other railing system or protective railing. Such an aspect of the present invention provides a solar heating system that functions as both a protective railing or guard and a solar energy collector.

According to one aspect, the heat exchange system may further comprise an expansion tank to accommodate increases in the volume of the working fluid.

According to another aspect, a pressure relief valve may be incorporated in the heat exchange system to release working fluid from the piping infrastructure in the event of a failure of the control valve, the solar pump or a vapor lock within the system.

According to another aspect, the piping infrastructure of the heat exchange system may further comprise fill and drain valves to facilitate loading of the piping infrastructure with the working fluid and to allow access to the working fluid to test the conditions of the working fluid.

This summary does not necessarily describe all features of the invention. Other aspects, features and advantages of the invention will be apparent to those of ordinary skill in the art upon review of the following description of specific embodiments of the invention.

DETAILED DESCRIPTION

The exemplary embodiments of the present invention relate to apparatus and systems for thermostatic regulation of the circulation of working fluids throughout solar thermal energy capture systems. The thermoregulation apparatus and systems are suitable for integration into systems designs for new installations of solar thermal energy capture systems.

One exemplary embodiment relates to an apparatus that comprises a thermostatically actuated valve with: (a) ingressing piping interconnected to a piping infrastructure communicating with an egressing flow of working fluid from one or more solar energy collector panels, and (b) a first egressing piping interconnected with a piping infrastructure communicating with one side of a heat exchange unit receiving a flow of potable water or alternatively, a non-potable fluid supply exemplified by water containing anti-freeze solutions, oils and the like, from its other side, and (c) a second egressing piping interconnected with piping infrastructure communicating with the ingressing inlets of the one or more solar energy collector panels. When the temperature of the working fluid is about or higher than its selected temperature set point, the thermostatically actuated valve diverts the flow of working fluid egressing from the solar energy collector panels to the piping infrastructure communicating with the heat exchange unit. When the temperature of the working fluid is lower than about its selected temperature set point, the thermostatically actuated valve diverts the flow of working fluid egressing from the solar energy collector panels to the piping infrastructure communicating with the ingressing inlets of the one or more solar energy collector panels. It is suitable to select a thermostatically actuated valve that may optionally (a) completely divert the flow of working fluid into piping ingressing into the heat exchange unit, (b) completely divert the flow of working fluid into the piping infrastructure communicating with the ingress inlets of the solar energy collector panels, or (c) divert some of the working fluid flow into piping ingressing into the heat exchange unit and divert the rest of the working fluid flow into the piping infrastructure communicating with the ingress inlets of the solar energy collector panels. The apparatus can be integrated into new systems designs for solar thermal energy capture systems for new installations. Alternatively the apparatus may comprise a thermostatically actuated valve provided with an ingressing piping component and a pair of egressing piping components suitable for retrofitting into an operational solar thermal energy capture system. It is optional to provide the apparatus components in kits for installation into new systems or for retrofitting into previously installed systems.

Figure 1:
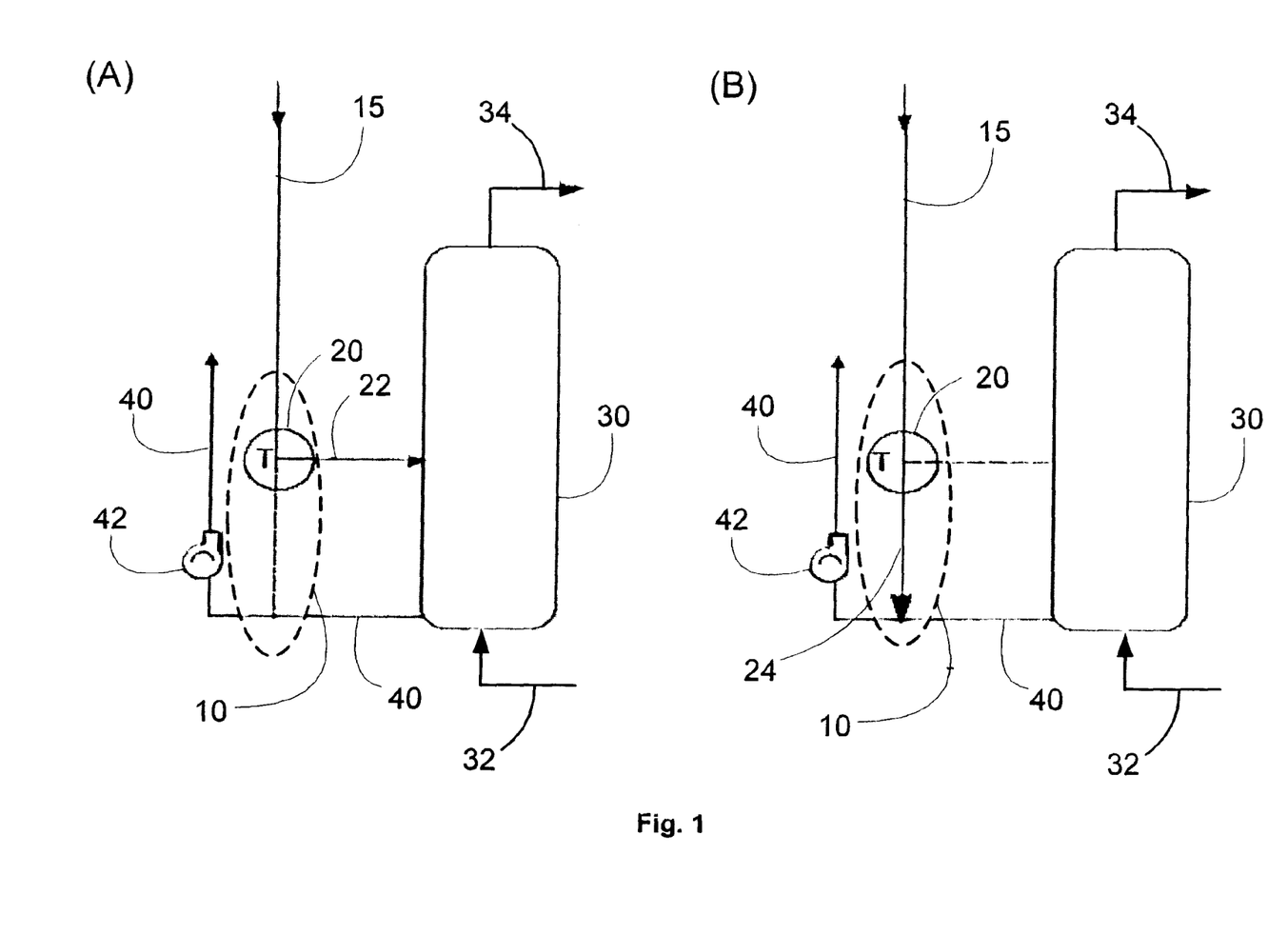
FIGS. 1(A) and 1(B) are schematic diagrams of an exemplary embodiment of the present invention operating to thermostatically control the flow of working fluid from a solar energy collector panel to a heat exchange unit (FIG. 1(A)), or to bypass the heat exchange unit (FIG. 1(B))

FIG. 1(A) is a schematic diagram showing the apparatus 10 of the present invention interposed an exemplary solar energy collection system. Line 15 egressing working fluid from a solar energy collector panel (not shown) ingresses thermostatically controlled valve 20. The thermostatically controlled valve 20 diverts the flow of working fluid into line 22 ingressing a heat exchange unit 30 that receives inflowing potable water through line 32. Heat is transferred from the working fluid in line 22 to the potable water flowing through line 32. Heated potable water egresses the heat exchange unit 30 via line 34, while the cooled working fluid egresses from the heat exchange unit 30 through line 40 returning to the solar energy collector panel (not shown). Pump 42 is interposed line 40 to maintain circulation of the working fluid through the solar thermal energy capture system. When the working fluid ingressing the thermostatically controlled valve 20 is below the set point, the thermostatically controlled valve 20 diverts the flow of the working fluid into line 24 that interconnects line 40 returning to the solar energy collector panel (FIG. 1(B)). It is to be noted that in the exemplary system illustrated in FIGS. 1(A) and 1(B), the heat-exchange unit 30 comprises: (i) a tank for storing the heated potable water or alternatively the heated non-potable fluid supply, and (ii) a heat-exchange unit mounted inside the tank. A suitable thermostatically controlled valve is exemplified by the Therm-Omega-Tech model M/D temperature control valve designed for 3-way diverting of fluid flows (Therm-Omega-Tech Inc, Warminster, Pa., USA). The M/D valve will divert or switch the flow of fluid to either of the two egressing ports depending on the working fluid temperature.

The control valves in the solar fluid heat exchange system may be thermo-static valves that respond to the temperature of the working fluid. These thermo-static valves require no electrical energy to operate and therefore, with the inclusion of a photo-voltaic powered pumping system, the solar fluid heat exchange system can be 'off-grid' meaning independent of externally-supplied electrical energy. The control valves can also be electrically operated valves common in industry and residential heating systems. These valves require temperature sensors in critical areas and with signaling provided from a pre-programmed processor, direct fluid flows based on temperature readings detected by the temperature sensors. The processor in these cases can optionally use relative temperatures instead of absolute temperatures as in the case of thermo-static valves, to direct the flow of the working fluid. For example, the low temperature control valve can divert the working fluid back to the solar collector until the working fluid is higher than the temperature of the storage tank.

Another exemplary embodiment relates to solar thermal energy capture systems comprising an apparatus of the present invention interposed (a) piping egressing from one or more solar energy collector panels conveying working fluid to a heat exchange unit communicating with potable water on the other side, and (b) the heat exchange unit. One of the two piping infrastructures egressing from the thermostatically actuated valve comprising the apparatus, is interconnected with piping ingressing the heat exchange unit. The other piping infrastructure egressing from the thermostatically actuated valve, is interconnected with the piping infrastructure communicating with the ingress inlets of the solar energy collector panels.

Exemplary solar thermal energy capture systems of the present invention generally comprise: (a) a piping infrastructure; (b) one or more solar energy collector panels in fluid communication with the piping infrastructure; (c) a thermostatically actuated valve in fluid communication with the piping infrastructure, (d) a fluid storage tank or reservoir, and optionally (e) a heat exchange unit in fluid communication with the piping infrastructure and the thermostatically actuated valve. The piping infrastructure preferably comprises piping that is insulated or otherwise treated to minimize transfer of thermal energy from the working fluid circulating therein, to the ambient environment. A working fluid circulates through the piping infrastructure to be heated by the one or more solar energy collector panels, which thereafter circulates to the fluid storage tank. The thermoregulation apparatus operates as a cold temperature bypass for the heat exchange system to reduce the loss of efficiency of the heat exchange system when there is cold working fluid circulating through the piping infrastructure. This typically occurs when the solar thermal energy capture system first begins operating each morning since the working fluid would have cooled substantially in the absence of solar irradiation of the solar energy collector panels. The thermoregulation apparatus comprises a thermostatically actuated valve configurable for diverting the fluid in piping infrastructure away from the heat storage unit and back to the one or more solar energy collector panels for heating if the temperature of the fluid is below a preset minimum operating temperature. Preferably the valve is a thermostatically actuated valve preset at a minimum operating temperature. A suitable minimum operating temperature may be selected based on one or more of ambient atmospheric conditions, ambient conditions inside the building structure, or the desired temperatures for diverting the flow of working fluid into the heat exchange unit. A suitable minimum operating temperature may be selected anywhere from the range of about 10° C. to about 35° C., about 15° C. to about 25° C., about 20° C. to about 25° C. for domestic water heating applications. Other heating applications may have other minimum temperatures. Without such a thermoregulation apparatus, cold fluid in the piping infrastructure would circulate into the heat exchange unit. The cold working fluid would absorb heat from the warmer potable water or heating load fluid circulating through the other side of the heat exchange unit thereby causing undesirable heat losses from the potable water or heating load fluid.

Figure 2:
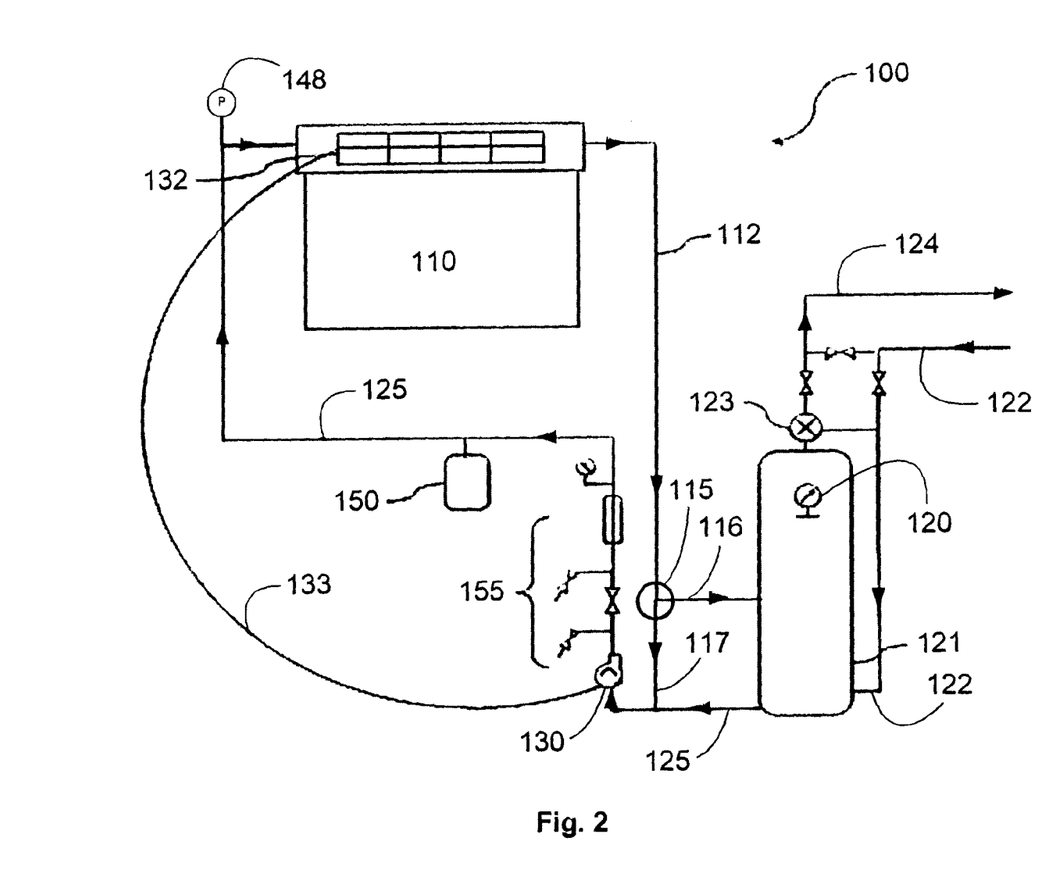
FIG. 2 is a schematic diagram of an exemplary solar thermal energy capture system comprising an exemplary thermoregulation apparatus of the present invention.

An exemplary solar thermal energy capture indirect system 100 is shown in FIG. 2 and comprises a solar energy collector panel 110 interconnected with a working fluid piping infrastructure 112 interconnected with the ingress inlet of a first thermostatically actuated valve 115. The first egress outlet of the first thermostatically actuated valve 115 is provided with piping 116 that is interconnected with the working fluid ingress inlet of a heat exchange unit (not shown) directly mounted onto or inside a hot water storage tank 121. The working fluid egress outlet of the heat exchange unit is interconnected with working fluid piping infrastructure 125 for return of cooled working fluid to the solar energy collection panel 110.

The second egress outlet of the first thermostatically actuated valve 115 is provided with piping 117 that is interconnected with the working fluid piping infrastructure 125 for return of cooled working fluid to the solar energy collector panel 110. A pressure relief valve 148 is interposed piping 125. A pump 130 is provided interposed in the working fluid piping infrastructure 125 to enable manipulation of the rates of recirculation of the working fluid through working fluid piping infrastructures 112 and 125 for manipulable communication with the various components of the solar thermal energy capture system 100 on an "as need" basis. The pump 130 may be optionally powered by electricity generated by an optional photovoltaic array 132 mounted in a suitable location on the exterior of the building for efficient solar irradiation. The photovoltaic array 132 communicates with the pump 130 by wiring 133. If desired, additional equipment may be interposed in communication with working fluid piping infrastructure 125 as exemplified by a fill station 155 comprising two fill/drain valves, a fill control valve in between the two fill/drain valves, a visual flow meter and a pressure gauge, an expansion tank 150, and the like. The water side of the heat exchange unit is in communication with a piping infrastructure configured for distribution of potable water throughout a building. Piping 122 supplies a flow of water into the ingress inlet of the heat exchange unit mounted onto or inside the hot water storage tank 121. Thermal energy is transferred from the working fluid flowing through the working fluid side of the heat exchange unit to the water flowing through or surrounding the water side of the heat exchange unit thereby significantly increasing the water temperature that can be monitored by temperature gauge 120. The heated water is then stored in the hot water storage tank 121 until it is transferred into egress piping 124 for delivery throughout the building as required. An optional anti-scald valve 123 may be interposed in the egress piping 124 from the hot water storage tank 121 if so desired, to act as a safety device for ensuring water exiting the hot water storage tank 121 does not exceed safe temperatures for use elsewhere in the building.

The solar energy collector panels 110 incorporated into exemplary solar thermal energy capture systems of the present invention, may comprise fluid-conveying evacuated-tube pipe collectors. Alternatively, flat-plate solar energy collectors or any other type of solar thermal collector or panel suitable for absorbing solar irradiation and transferring it as thermal energy to circulating working fluid systems, may be incorporated into the exemplary solar thermal energy capture systems of the present invention.

The thermostatically actuated valve 115 is operable as a cold-temperature bypass control device. The thermostatically actuated valve 115 is interposed in the piping infrastructure 112 between the solar energy collector panels 110 and the heat exchange unit 120. Hot water generated by the heat exchange unit through transfer therein of thermal energy from the working fluid side to the water side, is stored in the hot water storage tank 121 until it is required at a "point of use" elsewhere in the building. The thermostatically actuated valve 115 is configurable to divert the flow of the working fluid to piping infrastructure 125 via piping 117 for recirculation to the solar energy collector panels 110 if the working fluid is colder than the preset minimum operating temperature in the thermostatically actuated valve 115. When the temperature of the working fluid is about or greater than the preset minimum operating temperature for the thermostatically actuated valve 115, the valve 115 will partially or completely divert the flow of working fluid to the heat exchange unit via piping 116, or alternatively if so configured, directly into the hot water storage tank 121.

The solar thermal energy capture system 100 further comprises a recirculating pump 130 for providing a flow of working fluid through piping infrastructures 125 and 112. Any type of pump suitable for modulating rates of fluid flow through piping infrastructures can be used in the solar thermal energy capture system 100. An exemplary recirculating pump is a solar-energy powered pump receiving electricity generated by power produced by a photovoltaic array or panel 132 to remove reliance upon external electrical energy. The photovoltaic panel 132 may be integrated with the one or more solar energy collector panels 110 or may be installed in a location separated from the one or more solar energy collector panels 110. Use of photovoltaic panels 132 as a source of power for the recirculating pump 130 may cause the pump 132 to circulate the working fluid at a rate proportionately to the intensity of solar irradiation received by the photovoltaic panel 132. In other words, when solar irradiation is intense, the recirculating pump 130 will circulate the working fluid at high rates through the various components of the solar thermal energy capture system 100. When solar irradiation is modest or absent, e.g., through evening and into night conditions, the power generated by the photovoltaic panel 132 will diminish and cease thereby resulting in the cessation of working fluid flow throughout the solar thermal energy capture system 100. This increases the efficiency of the system and removes the system's reliance on grid-supplied electrical energy. It is optional to include an expansion tank 150 to accommodate increases in the volume of working fluid circulating throughout the solar thermal energy capture system 100 as the temperature of the working fluid increases as a consequence of increasing solar irradiation intensity. It is also optional to incorporate a pressure relief valve 148 for emergency release of working fluid from the piping infrastructures comprising the solar thermal energy capture system 100 in the event of failures in the recirculating pump 130, or if vapor locks occur unexpectedly within the piping infrastructure or any of the components comprising the solar thermal energy capture system 100.

Figure 3:
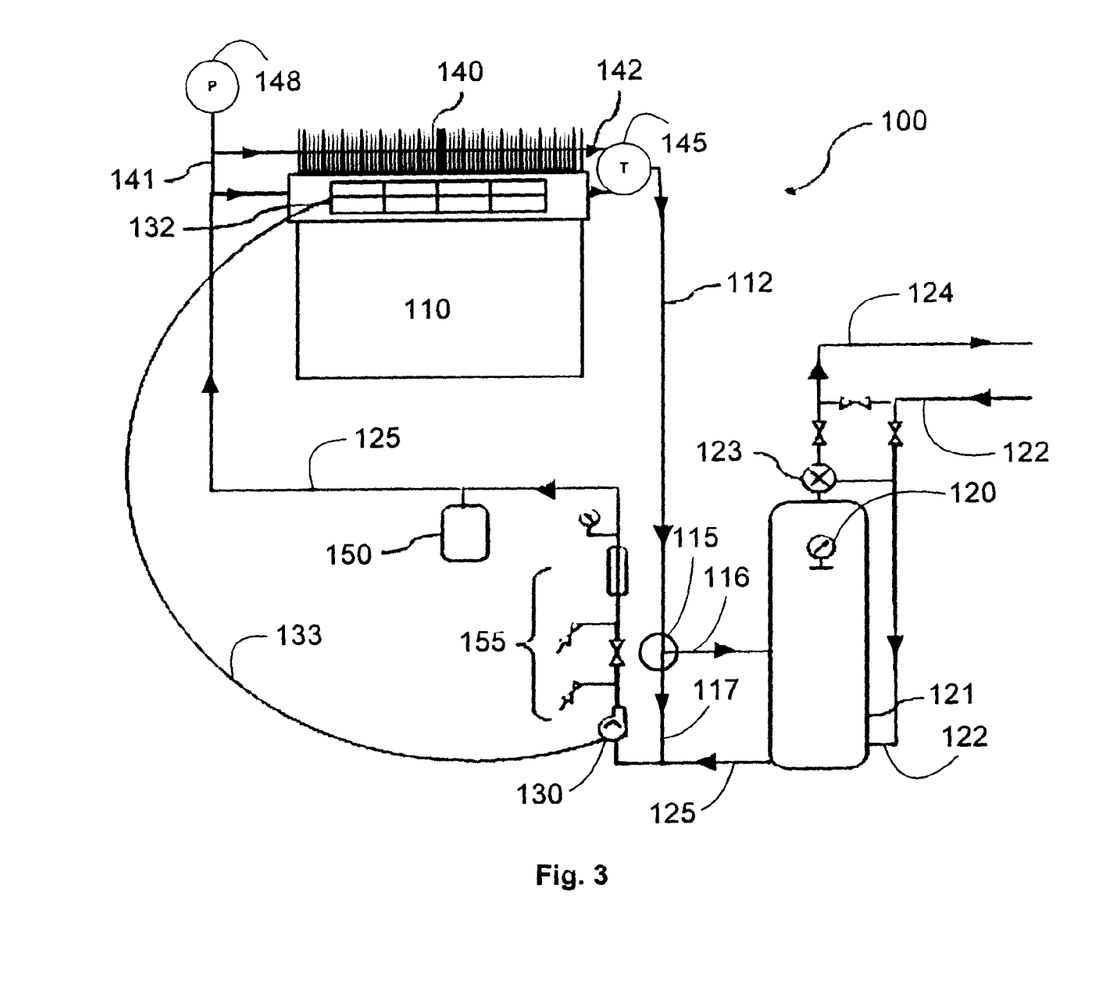
FIG. 3 is a schematic diagram of the solar thermal energy capture system from FIG. 2, additionally comprising a heat dissipater.

The solar thermal energy capture systems of the present invention illustrated in FIG. 2 may be optionally fitted with and interconnected with a heat dissipater 140 as exemplified in FIG. 3. The solar energy collector panel 110 interconnected with the working fluid piping infrastructure 112 interconnected with the ingress inlet of the first thermostatically actuated valve 115 may be additionally interconnected with the ingress inlet of a second thermostatically actuated valve 145. The second ingress inlet of the second thermostatically actuated valve 145 is interconnected with the outlet of a heat dissipater 140 by piping 142. The inlet of the heat dissipater 140 is interconnected with piping 141 in fluid communication with the ingress inlet of the solar energy collector panel 110. When the temperature of the working fluid egressing from the solar energy collector panels 110 is about or greater than the maximum operating temperature preset on the second thermostatically actuated valve 145, the valve 145 will blend some of the working fluid egressing from the heat dissipater 140 through piping 142 for cooling therein to the maximum operating temperature after which the working fluid is conveyed through the egressing piping 112 interconnected with the first thermostatically actuated valve 115. The second thermostatically actuated valve 145 is responsive to temperature, pressure or other condition suitable as being indicative of overheating while the solar thermal energy capture system is in operation. Alternatively, the second thermostatically actuated valve 145 may be thermally-actuated, pressure-actuated, or activated by any other condition capable of being indicative of overheating. When the second thermostatically actuated valve 145 is thermally-actuated and the temperature of the working fluid exiting the one or more solar energy collector panels 110 reaches or exceeds the preset maximum temperature threshold, the second thermostatically actuated valve 145 will open and blend at least a portion of the working fluid from the heat dissipater 145 wherein the heated working fluid is cooled. The cooled working fluid egressing from the heat dissipater 140 is thereafter mixed with heated working fluid egressing from the solar energy collector panels 110 into the egressing piping infrastructure 112. When the temperature of the working fluid is below the preset maximum operating temperature, such as when sufficient heat has been used at the point of use or sufficient heat has been dissipated from the working fluid, the second thermostatically actuated valve 145 closes to divert the entire flow of working fluid toward the first thermostatically actuated valve 115. As the temperature of the heated working fluid fluctuates in response to changes in heat dissipation, such as when atmospheric conditions change and alter heat dissipation from the heat dissipater 140, the volume of working fluid mixed by the second thermostatically actuated valve 145 is continually modulated to maintain the temperature of the working fluid at just under about the maximum preset operating temperature.

The heat dissipater 140 may comprise a fin and tube radiator for exchanging heat from the working fluid to the atmosphere. Alternatively, the heat dissipater 140 may comprise a flat plate radiator, a ground loop or any other type of heat sink or dissipater to absorb the excess heat from the working fluid. One of skill in the art would appreciate that the size of the heat dissipater 140 would be sized in accordance with the size of the solar energy collector panels 110 and the demands of the particular solar thermal energy capture system 100 to balance the heat loss of the system with the heat gain.

Figure 4:
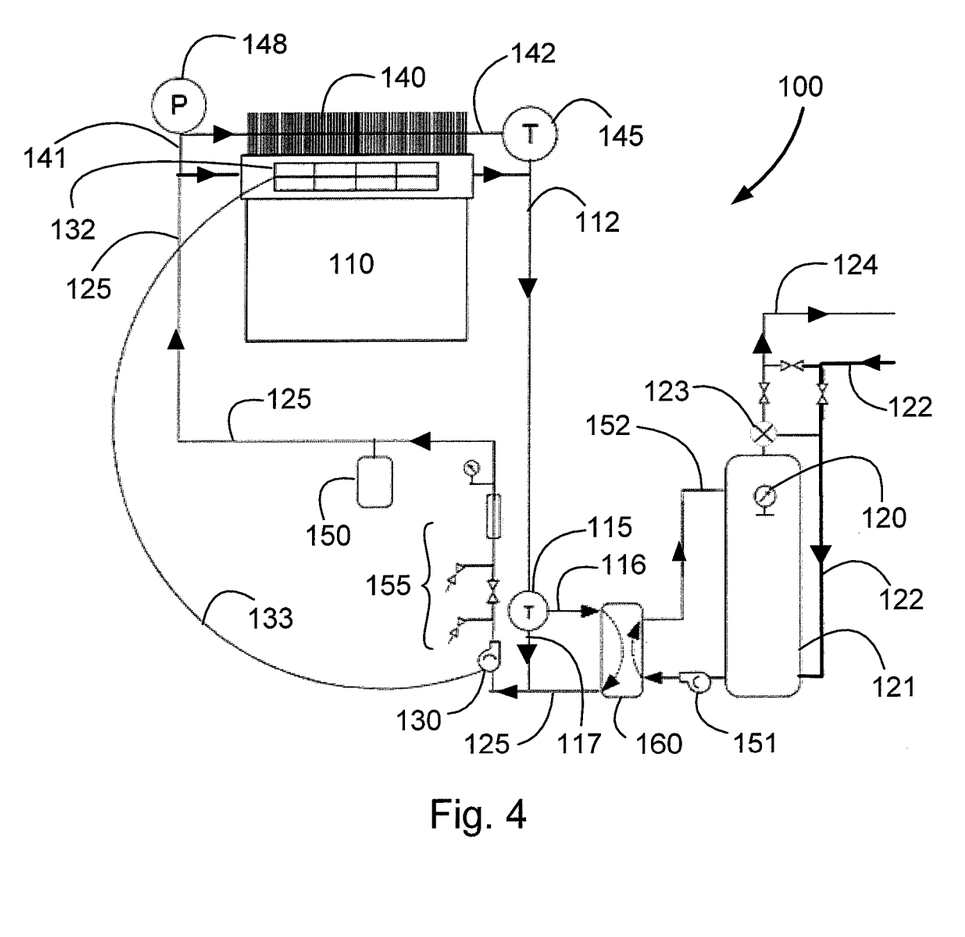
FIG. 4 is a schematic diagram of the solar thermal energy capture system from FIG. 3, showing the heat exchange unit physically separated from hot water storage tank.

FIG. 4 shows the heat exchange unit 160 separated from the hot water storage tank 121. Working fluid diverted into piping 116 by the first thermostatically actuated valve 115 flows through the heat exchange unit 160 and then is returned to piping infrastructure 125 for recycling back to the solar energy collector panel 110. Water is transferred from the hot water tank 121 to the heat exchange unit 160 by pump 151 wherein it acquires heat transferred from the working fluid, and then is returned to the hot water storage tank 121 via piping 152.

It is within the scope of the present invention to provide strategically located fill valves and drain valves through out the solar thermal energy capture system 100 where appropriate to enable loading of the piping infrastructures 112 and/or 125 with working fluid, to allow periodic checking of the pH and compositional stability and quality of the working fluid, and if necessary, to replace the working fluid with fresh working fluid, or alternatively, to add additional anti-scaling agents and/or anti-fouling and/or anti-corrosion agents and/or anti-freeze agents. It is optional if so desired, to use an oil as the working fluid. A suitable oil is exemplified by Duratherm LT heat transfer fluid (Duratherm Extended Life Fluids, Lewston, N.Y., USA).

According to one aspect of the present invention, the solar thermal energy capture system of the present invention may be a direct system or alternatively, an indirect system wherein the heating load fluid storage tank or reservoir 121 is in fluid communication with: (a) the first thermostatically actuated valve 115, and (b) point of use located throughout and/or connected to the building. Suitable points of use are exemplified by hot water storage tanks, swimming pools, space heating via hydronics, forced-air heating systems, radiant or other fluid-based heating systems, process water treatment, working fluid heating for use in industrial, refining, processing, power generation, smelting or commercial operations, heating of cleaning water for commercial laundries, car washes and the like, heating for oil, gas or water well heads, pipelines and livestock watering, or any other heating or pre-heating application, either directly or indirectly from the solar heated fluid. A suitable minimum operating temperature for domestic water heating applications may be selected anywhere from the range of about 10° C. to about 35° C., 15° C. to about 25° C., about 20° C. to about 25° C. If the end-point use is for heating a hot tub, then a suitable minimum operating temperature for domestic water heating applications may be selected anywhere from the range of about 15° C. to about 50° C., about 25° C. to about 45° C., about 35° C. to about 45° C. If the end-point use is for heating a space heater, then a suitable minimum operating temperature for domestic water heating applications may be selected anywhere from the range of about 10° C. to about 65° C., about 20° C. to about 55° C., about 25° C. to about 50° C.

The present invention will be further illustrated in the following examples. However it is to be understood that these examples are for illustrative purposes only, and should not be used to limit the scope of the present invention in any manner.

Example 1

A prototype solar thermal energy capture system was tested at an outdoor research facility in Calgary, AB, CA, in December 2010. The solar thermal energy capture system approximated the design shown in FIG. 2 and comprised three solar energy collector panels mounted on the wall of a research building, each at an angle of about 85 degrees from horizontal. Each solar energy collector panel comprised twenty evacuated-tube collectors. The dimensions of each tube were 58 mm×1800 mm, with each panel rated at a maximum thermal output of about 5,000 BTU per hour. The tops of the twenty tubes were interconnected with a top manifold (exemplified by products available from Jiangsu Sunrain Co. Ltd.). The top manifolds of the three solar panels were interconnected and were in fluid communication with the ingress piping infrastructure. "Ingress inlet" temperatures were recorded about the interconnection of the ingress piping infrastructure with the array of solar panels. "Egress outlet" temperatures were recorded about the interconnection of the egress piping infrastructure with the array of solar panels. The egress and ingress piping infrastructures were constructed with ¾" cross-linked polyethylene (PEX) pipe and fittings. The working fluid comprised about 40% distilled water mixed and about 60% non-toxic propylene glycol to ensure the working fluid did not freeze at −40° C. temperatures. An expansion tank having a volume sufficient to contain about 5% of the volume of the fluid at 20° C., was fluidly connected to the ingress piping infrastructure. The pressure within the piping infrastructure was maintained at a lower pressure (~20 psi) than that in the hot water tank (~70 psi) to avoid propylene glycol from entering the domestic hot water system in the event of a leak in the internal heat exchanger in the storage tank. A 16-foot length of fin and tube radiator formed the heat dissipater for the solar thermal energy capture system and was fluidly connected to the piping infrastructure to allow at least a portion of the working fluid to bypass the solar energy collector panels. The heat dissipater was sized to exceed the maximum BTU rating of the solar energy array by about 16% or about 2,400 BTU per hour. An inlet to the heat dissipater was upstream of the solar energy collector panels and an outlet of the heat dissipater was downstream of the solar energy collector. A thermally-actuated M/D temperature control valve, exemplified by those available from Therm-Omega-Tech Inc. (e.g., Model 353-000-200, Therm-Omega-Tech Inc, Warminster, Pa., USA), was connected to the piping infrastructure downstream from the solar energy collector panels and the heat dissipater. The preset maximum operating temperature of the control valve was set at 90° C. (200° F.). The control valve was installed to mix the flow of at least a portion of the working fluid from the heat dissipater with the fluid from the solar energy collector panels if the temperature of the working fluid exceeded 90° C. A second thermally actuated M/D control valve designed for 3-way diverting of fluid flows (e.g., Model 353-000-070, Therm-Omega-Tech, Warminster, Pa., USA) was interposed the egress piping infrastructure downstream to the solar thermal energy capture panels and upstream to the solar hot water tank. This diverting valve diverts working fluid with a temperature: (a) less than about 20° C. (70° F.) back to the solar collector panels, and (b) greater than about 20° C. (70° F.) into the heat exchanger inside the solar hot water tank. A variable-speed DC Pump, exemplified by an Ecocirc® pump (Ecocirc is a registered trademark of Laing Thermotech, Inc., San Diego, Calif., USA) was used to pump the working fluid through the egress piping and ingress piping infrastructure. The DC pump was powered by a 25 watt photovoltaic solar panel (available from Fuzhou Pingchi Import & Trading Co of China) located on one of the solar collector panels. Fill and drain valves were incorporated into the piping infrastructure to facilitate loading of the piping infrastructure and to permit periodic checking of the pH and strength of the propylene glycol/water mixture. A pressure relief valve ("PRV") with a preset pressure threshold of about 50 psi was connected to the piping infrastructure. The PRV was configured to open and release the working fluid to the roof of the structure if the pressure within the piping infrastructure exceeded the preset pressure threshold, for example as a result of a failure in the system. An anti-scald valve (Danfoss ESSBE 065B8870 valve available from Danfoss Hydronic Heating North America) was placed on the outlet of the solar hot water tank to act as a safety device for ensuring water exiting the solar hot water tank did not exceed a safe temperature, in this case about 55° C. (131° F.) to about 60° C. (140° F.). The egress piping infrastructure was interconnected with a 300-L solar hot water tank located in the building's heated mechanical room. The egress piping infrastructure was about 20 meters long, with 10 meters fastened to the building's exterior surfaces and the remainder connecting the exterior portion of the piping infrastructure with the solar hot water tank. A digital flow meter measured the rate of flow of the working fluid circulated by the DC pump. The solar thermal energy capture system was provided with temperature sensors mounted on the piping infrastructure in a number of locations, including: (a) about the ingress inlet to the solar thermal array consisting of three solar energy collector panels; (b) about the egress outlet from the solar thermal array; and (c) about the inlet to the solar hot water storage tank.

Figure 5:
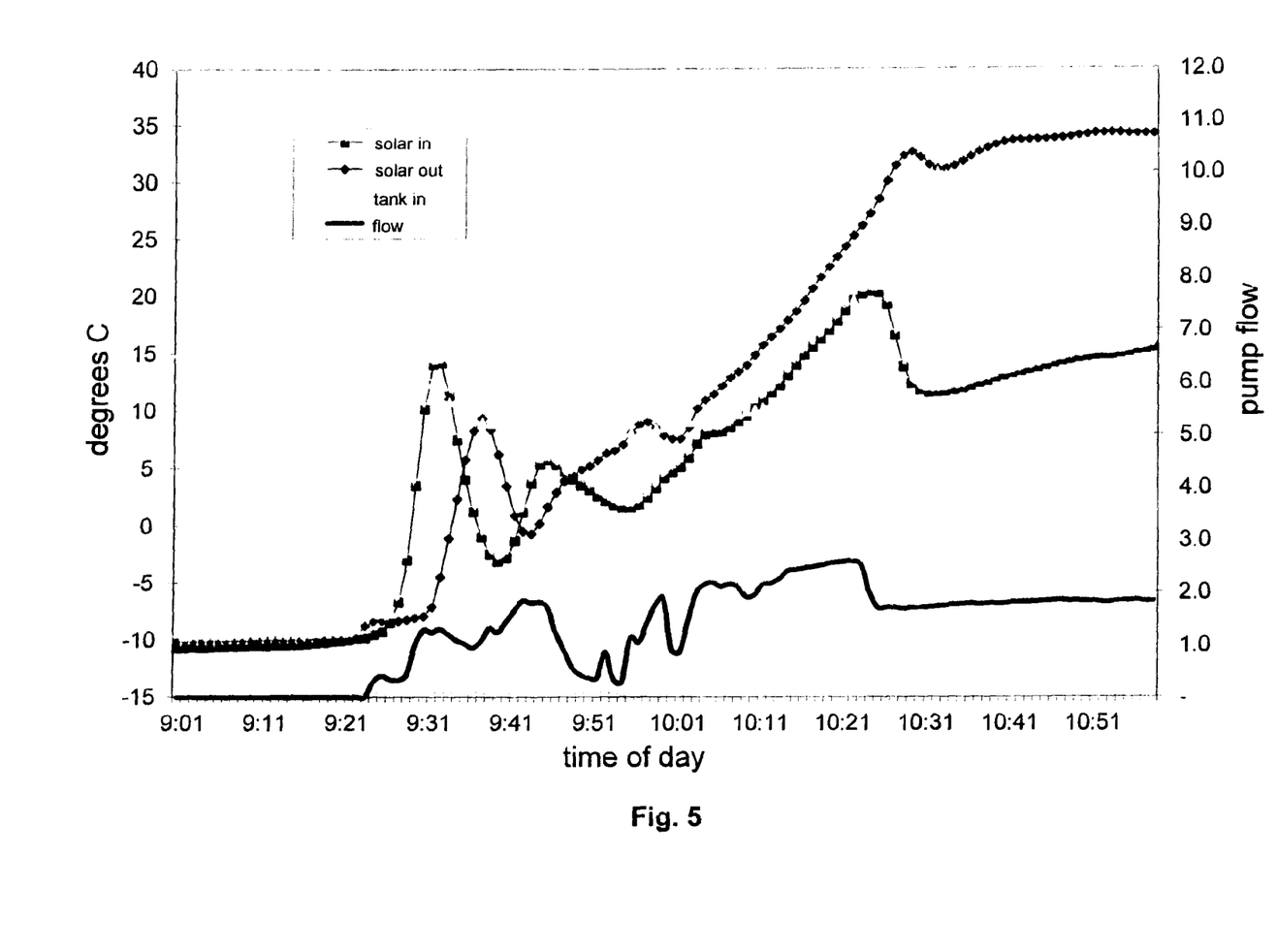
FIG. 5 is a chart showing the temperature changes in working fluid flowing into a solar energy collector panel (dark grey squares), working fluid flowing out of the solar energy collector panel (black diamonds), and the working fluid at the inlet to a water storage tank (light grey triangles), and the rate of flow of the working fluid in the solar energy thermal energy capture system (solid black line) at an ambient temperature of −12° C. (10 am reading)

FIG. 5 shows the temperature changes that occurred over a 2-h period between 9 am and 11 am. The ambient temperature at 9 am was about −12° C. It was a sunny day with no cloud cover. During the time period between 9 am and 9:23 am, there was no flow of working fluid from the solar-powered DC pump (solid black line). Temperatures about the inlet and about the outlet of three array of solar energy collector panels were about −11° C. (grey squares and black diamond, respectively). The temperature about the inlet to the hot water tank was about 15° C. (light grey triangles) which represented the ambient temperature near the floor of the heated mechanical room.

The DC pump started up at about 9:23 am, as evidenced by detection of flow of the working fluid. The working fluid continued to flow, albeit at different rates, for the duration of the start-up time. As soon as the pump started, the temperature about the inlet to the array of solar energy collector panels spiked from −11° C. to about 15° C., as a consequence of transfer of working fluid that was resident in the ingress piping infrastructure located inside the heated building to the array. The temperature about the egress outlet from the array of solar energy collector panels also increased but lagged about 10 minutes behind the increase in fluid temperatures at the array ingress inlet. This lag represents the amount of time that was required to clear the "over-night" working fluid from the array of solar energy collector panels. The temperature at the ingress inlet adjacent to the solar hot water storage tank inlet dropped about 5° C. as the colder outside fluid was transferred through the egress piping infrastructure to about the inlet to the solar hot water storage tank. Because the temperature of the "over-night" working fluid displaced from array of solar energy collector panels was below 20° C., the thermostatic diverting valve directed the flow of the "over-night" working fluid back to the solar energy collector panels resulting in a drop in the temperatures measured at about the ingress inlet to the array of solar energy collector panels.

At about 9:40 am the temperature at the inlet to the solar array stopped dropping as the cold outside fluid and the warm inside fluid blended and reflects a mixed temperature of −3° C. At this point the working fluid started to increase as a result of the solar energy gain.

At about 9:50 am, the solar thermal energy capture system stabilized and the temperatures at about both the ingress inlet and the egress outlet of the array of solar energy collector panels began climbing as the system settled into a heating mode.

At approximately 10:21 am, the temperature recordings about the egress outlet of the solar panels exceeded 20° C. and the thermostatic valve began diverting the solar-irradiation-warmed working fluid egressing from the solar energy collector panels to the heat exchanger in the solar hot water storage tank. This resulted in the ingress inlet to the solar hot water storage tank beginning to increase (light grey triangles) as well as cooling of the working fluid as evidenced by the drop in ingress temperature to the solar array (boxes) after a few minutes delay.

By 10:30 am, the solar thermal energy capture system settled into its heat production mode. The pump recirculated the working fluid at a steady rate of about 1.7 liters pr minute. The temperatures about the ingress inlet to the array of solar energy collector panels stabilized at about 15° C. (dark grey squares), reflecting the cold domestic water temperature in the solar hot water storage tank that started to gradually increase. The temperatures about the egress outlet of the array stabilized near 35° C. (black diamonds) and were similar to the temperatures recorded about the inlet to the heat exchanger on the solar hot water storage tank (light grey triangles) which is slightly lower due to ambient losses in the piping infrastructure.

Example 2

Figure 6:
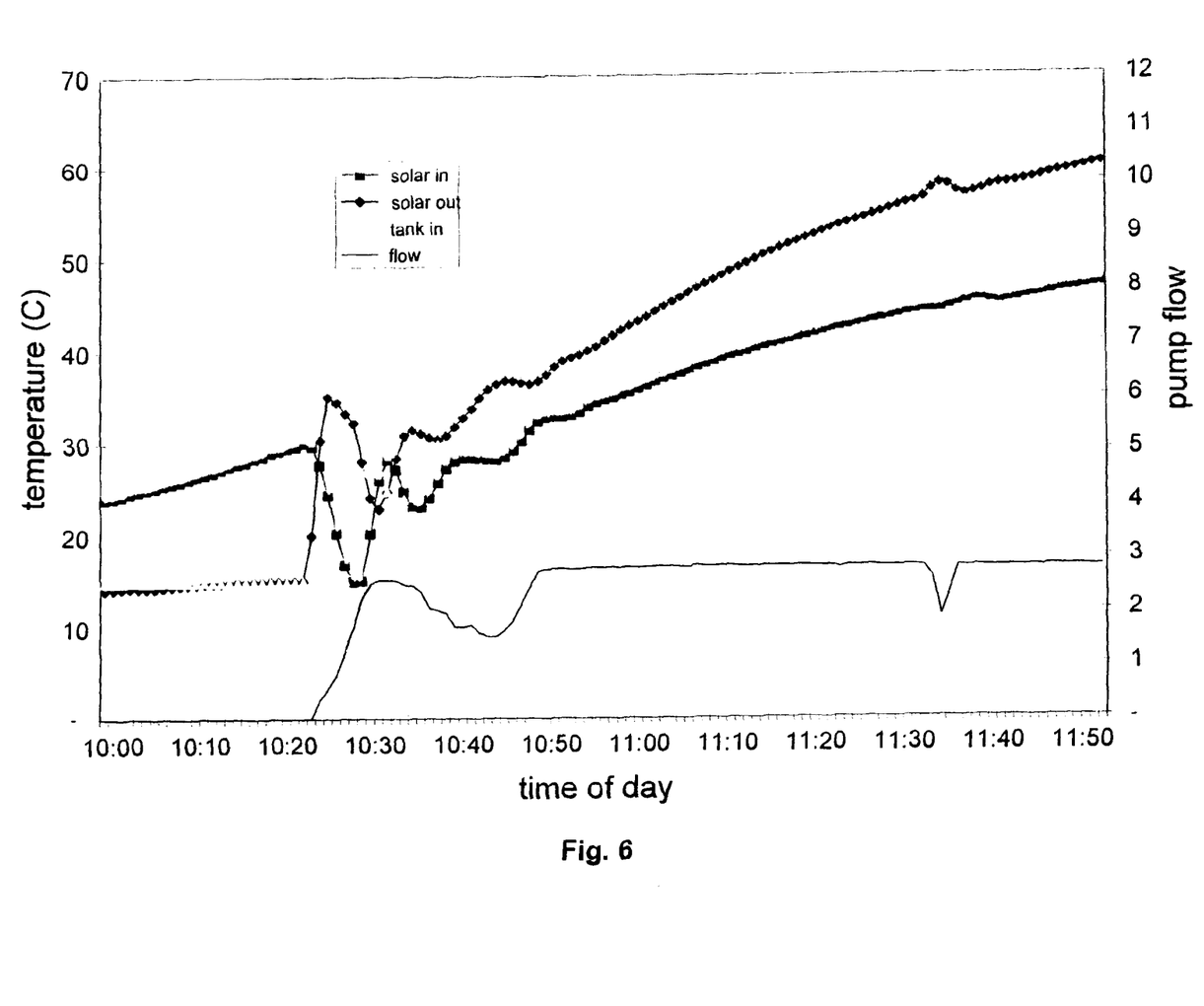
FIG. 6 is a chart showing the temperature changes in working fluid flowing into a solar energy collector panel (dark grey squares), working fluid flowing out of the solar energy collector panel (black diamonds), and the working fluid at the inlet to a water storage tank (light grey triangles), and the rate of flow of the working fluid in the solar energy thermal energy capture system (solid black line) at an ambient starting temperature of +12° C. (10 am reading).

The prototype system described in Example 1 was configured and installed on a research building in Calgary, AB, CA, in August 2010. FIG. 6 shows the temperature changes that occurred over a 2-h period between 10 am and 12 noon. The ambient temperature at 10 am was about +12° C.

The pump commenced operation at about 10:25 am and within 5 minutes, the temperatures recorded at the inlet and outlet of the solar collector panels reversed. The temperatures recorded at the egress outlet of the solar collector panels spiked as the working fluid heated by solar irradiation of the solar panels prior to commencement of the flow of working fluid flowed into the egress piping infrastructure. Concurrently the inlet temperature of the solar collector panels dropped as the working fluid that was heated by solar irradiation prior to the commencement of the flow of working fluid, was replaced by the ambient (i.e., +12° C.) working fluid that sat in the ingress piping infrastructure. The temperatures recorded about the inlet to the solar hot water storage tank were stable until about 10:30 AM at which point the spike in the solar outlet temperature is mirrored with about an 8 minute time delay. The working fluid and piping infrastructure continue to warm up until about 10:35, at which time the thermostatically actuated valve began diverting the flow of working fluid from the ingress piping into the heat exchanger inside the hot water storage tank as evidenced by the increase in the temperature at the inlet to the solar hot water storage tank and the drop in the solar inlet temperature. By 10:40 am, the system entered the heating production mode.

In comparison to the temperature recordings from the December trial outlined in Example 1, the August system start-up process diverted the flow of cold working fluid from the hot water storage tank for only about 10 minutes, whereas the December start-up process diverted cold working fluid from the hot water storage tank for over one hour.

The invention claimed is:

1. A thermoregulation kit for installation into a solar thermal energy capture system, wherein the solar thermal energy capture system comprises a piping infrastructure in fluid communication with a liquid storage tank and one or more solar thermal energy collectors, the thermoregulation kit comprising:
 a self-actuated temperature-responsive valve for installation interposed the piping infrastructure downstream from the one or more solar energy collectors and upstream from the liquid storage tank; and
 piping for interconnecting the self-actuated temperature-responsive valve with the piping infrastructure, and the liquid storage tank;
 wherein the self-actuated temperature-responsive valve either: (i) completely diverts the flow of a liquid working fluid away from the liquid storage tank when the temperature of the liquid working fluid is below a selected set point, or (ii) completely diverts the flow of the liquid working fluid to the liquid storage tank when the temperature of the liquid working fluid is about or greater than the selected set point.

2. A thermoregulation apparatus for a solar thermal energy capture system, wherein the solar thermal energy capture system comprises a piping infrastructure in fluid communication with one or more solar thermal energy collectors, a liquid storage tank, and a pump wherein a liquid working fluid is circulated by the pump directly from the one or more solar thermal energy collectors to the liquid storage tank, the thermoregulation apparatus comprising:
 a self-actuated temperature-responsive valve interposed the piping infrastructure downstream from the one or more solar energy collectors and upstream from the liquid storage tank; and
 piping for interconnecting the self-actuated temperature-responsive valve with the piping infrastructure, and the liquid storage tank;
 wherein the self-actuated temperature-responsive valve either: (i) completely diverts the flow of the liquid working fluid away from the liquid storage tank when the temperature of the liquid working fluid is below a selected set point for actuating the valve, thereby causing the flow of the working fluid to continuously circulate through the one or more solar thermal energy collectors and the piping infrastructure, or (ii) completely diverts the flow of the liquid working fluid to the liquid storage tank when the temperature of the liquid working fluid is about or greater than the selected set point.

3. The thermoregulation apparatus of claim 2, wherein the self-actuated temperature-responsive valve is interposed the piping infrastructure downstream from the one or more solar energy collectors and upstream from a heat exchange unit communicating with the liquid storage tank, wherein one side of the heat exchange unit is communicable with the thermostatically actuated self-actuated temperature-responsive valve and the other side of the heat exchange unit is communicable with the liquid storage tank.

4. The thermoregulation apparatus of claim 2, wherein the liquid working fluid comprises one of water or oil.

5. The thermoregulation apparatus of claim 2, wherein the liquid working fluid comprises water and an additive selected from the group consisting of anti-scaling agents, anti-fouling agents, anti-corrosion agents, and anti-freeze agents.

6. The thermoregulation apparatus of claim 2, wherein the set point for actuating the valve of the thermostatically actuated self-actuated temperature-responsive valve is selected from the range of about 10° C. to about 65° C.

7. The thermoregulation apparatus of claim 2, wherein the set point for actuating the valve of the thermostatically actuated self-actuated temperature-responsive valve is selected from the range of about 15° C. to about 55° C.

8. A thermoregulation kit for installation into a solar thermal energy capture system, the kit comprising:
 the self-actuated temperature-responsive valve according to claim 2; and
 piping for interconnecting the self-actuated temperature-responsive valve with (i) the piping infrastructure, and (ii) the liquid storage tank, and/or (iii) the heat exchange unit.

9. A solar thermal energy capture system comprising:
 one or more solar thermal energy collectors;
 a liquid storage tank;
 a piping infrastructure fluidly interconnecting the one or more solar thermal energy collectors and the liquid storage tank;
 a liquid working fluid for communicating with the one or more solar thermal energy collectors and the liquid storage tank therethrough the piping infrastructure;
 a pump for circulating the liquid working fluid throughout the solar thermal energy capture system; and
 a thermoregulation apparatus consisting: of a self-actuated temperature-responsive valve positionable interposed the piping infrastructure downstream from the one or more solar energy collectors and upstream from the liquid storage tank and piping for interconnecting the self-actuated temperature-responsive valve into the piping infrastructure downstream from the one or more solar energy collectors and upstream from the liquid storage tank;
 wherein the self-actuated temperature-responsive valve either: (i) completely diverts the flow of a liquid working fluid away from the liquid storage tank when the temperature of the liquid working fluid is below a selected set point for actuating the valve, thereby causing the flow of the liquid working fluid to continuously circulate through the one or more solar thermal energy collectors and the piping infrastructure, or (ii) completely diverts the flow of the liquid working fluid to the liquid storage tank when the temperature of the liquid working fluid is about or greater than the selected set point.

10. The solar thermal energy capture system of claim 9, wherein the set point for actuating the self-actuated temperature-responsive valve is selected from the range of about 10° C. to about 65° C.

11. The solar thermal energy capture system of claim 9, wherein the set point for actuating the self-actuated temperature-responsive valve is selected from the range of about 15° C. to about 55° C.

12. The solar thermal energy capture system of claim 9, wherein the liquid working fluid comprises one of oil, water, and a mixture of water and one of an anti-scaling agent, an anti-fouling agent, and an anti-freeze agent.

13. The solar thermal energy capture system of claim 9, additionally provided with a heat exchange unit interposed the self-actuated temperature-responsive valve and the liquid storage tank wherein one side of the heat exchange unit is fluidly communicable with the self-actuated temperature-responsive valve and the other side of the heat exchange unit is communicable with the liquid storage tank.

14. The solar thermal energy capture system of claim 9, additionally provided with a heat dissipater in controllable fluid communication with the piping infrastructure egressing from the one or more solar thermal energy collectors.

* * * * *